(12) United States Patent
Hryckowian et al.

(10) Patent No.: US 10,486,958 B1
(45) Date of Patent: Nov. 26, 2019

(54) FOLLOWER PLATE GEOMETRY

(71) Applicant: Integrated Dispense Solutions, Shelby Township, MI (US)

(72) Inventors: Andy Hryckowian, Washington, MI (US); David Ritchie, Macomb, MI (US)

(73) Assignee: Integrated Dispense Solutions, Shelby Township, MI (US)

( * ) Notice: Subject to any disclaimer, the term of this patent is extended or adjusted under 35 U.S.C. 154(b) by 0 days.

(21) Appl. No.: 16/113,160

(22) Filed: Aug. 27, 2018

(51) Int. Cl.
| | | |
|---|---|---|
| *B67D 7/02* | (2010.01) |
| *B05C 11/10* | (2006.01) |
| *F04B 15/02* | (2006.01) |
| *F04B 23/02* | (2006.01) |
| *B67D 7/62* | (2010.01) |
| *F04B 9/12* | (2006.01) |
| *F04B 43/06* | (2006.01) |
| *F04C 2/32* | (2006.01) |
| *F04C 2/08* | (2006.01) |

(52) U.S. Cl.
CPC ............ *B67D 7/02* (2013.01); *B05C 11/1002* (2013.01); *B67D 7/62* (2013.01); *F04B 15/02* (2013.01); *F04B 23/02* (2013.01); *F04B 9/12* (2013.01); *F04B 43/06* (2013.01); *F04C 2/08* (2013.01); *F04C 2/32* (2013.01); *F04C 2210/44* (2013.01)

(58) Field of Classification Search
CPC .......... B67D 7/02; B67D 7/62; B67D 7/0227; B05C 11/1002; F04B 15/02; F04B 23/02; F04B 9/12; F04B 43/06; F04C 2/32; F04C 2/08; F04C 2210/44; F15B 11/08; F15B 13/042; B65D 83/0044; B65G 65/005
USPC ... 222/320, 405, 146, 5, 319, 252, 259–263, 222/386–398, 464.4, 464.7; 219/230, 219/426, 540, 542
See application file for complete search history.

(56) References Cited

U.S. PATENT DOCUMENTS

| | | | |
|---|---|---|---|
| 2,997,215 A | | 8/1961 | Chinchole |
| 3,478,930 A | | 11/1969 | Rigby |
| 3,982,669 A | | 9/1976 | Moore |
| 4,355,734 A | * | 10/1982 | Moore .................... B05C 21/00 137/341 |
| 4,577,783 A | | 3/1986 | Racca et al. |
| 4,635,820 A | * | 1/1987 | Marshall ............... B29B 13/022 187/267 |
| 5,248,069 A | | 9/1993 | Consaga et al. |

(Continued)

*Primary Examiner* — Lien M Ngo
(74) *Attorney, Agent, or Firm* — Brinks Gilson & Lione

(57) ABSTRACT

A follower plate and an apparatus that uses the follower plate to force a viscous material to flow from a storage container. The follower plate includes a cylindrical outer body, a sealing element, and a material saving insert in which a plurality of ribs forms annular concentric slots having a length (L) that runs from the outer edge of the insert to an inner hub. Each slot further exhibits a width (w) that remains substantially the same along its length (L). Each slot further comprises a depth that is variable and tapers along its length (L), such that the depth of the slot approximate to the outer edge ($d_o$) is less than the depth of the slot approximate to the inner hub ($d_i$). The width and depth of the slots are configured so that any viscous material that has not been dispensed from the storage container resides within the slots.

20 Claims, 3 Drawing Sheets

(56) References Cited

U.S. PATENT DOCUMENTS

| | | | | |
|---|---|---|---|---|
| 5,257,723 A | * | 11/1993 | Bagung | B67D 7/0227 |
| | | | | 222/1 |
| 5,971,211 A | * | 10/1999 | Farley | B67D 7/80 |
| | | | | 222/146.5 |
| 6,046,437 A | * | 4/2000 | Frates | B29B 13/022 |
| | | | | 219/426 |
| 6,076,705 A | * | 6/2000 | Heckmann | B29B 13/022 |
| | | | | 222/146.5 |
| 6,422,430 B1 | * | 7/2002 | Ito | F04B 43/073 |
| | | | | 222/386 |
| 2001/0025864 A1 | | 10/2001 | Meyer | |
| 2008/0023082 A1 | * | 1/2008 | Schucker | B29B 13/022 |
| | | | | 137/565.17 |

\* cited by examiner

FOLLOWER PLATE GEOMETRY

FIELD

This disclosure relates generally to a follower plate and to an apparatus that uses said follower plate to force a viscous material to flow from a storage container.

BACKGROUND

The statements in this section merely provide background information related to the present disclosure and may not constitute prior art.

A variety of industries incorporate a follower plate into an apparatus that is configured to evacuate a hot melt adhesive and the like from a drum or other storage container. The follower plate generally includes a surface and a central aperture. The surface of the follower plate forces the melted adhesive to flow through the central aperture into a pump, which moves the adhesive to other fluid handling equipment near the point of its application onto the surface of a substrate.

A conventional follower plate typically has a concave lower surface that provides in effect a chamber that is in fluid communication with the central aperture. One problem with this follower plate design is that a portion of adhesive will remain in the storage container, which results in the generation of waste upon replacement of the "empty" storage container with a fresh or "full" storage container.

SUMMARY

The present disclosure generally provides a follower plate and an apparatus that uses the follower plate to force a viscous material to flow from a storage container. The apparatus configured to force a viscous material to flow from its storage container generally comprises the follower plate described above and further defined herein; a pump assembly that includes a pipe or tube that is in fluid communication with the follower plate; at least one controller; and a support stand that includes a base, two or more upright cylinders and rods associated therewith, and one or more support crossbars.

The follower plate incorporated with the apparatus generally comprises a cylindrical outer body, a sealing element, and a material saving insert. The cylindrical outer body has an inner periphery that forms an orifice that is in fluid communication with an opening in a pipe or tube of the apparatus through which the viscous material flows. The sealing element is located around the outer periphery of the cylindrical outer body and is configured to provide a leakproof seal with the storage container. The material saving insert is configured to fit within an indented region of the cylindrical outer body.

The material saving insert comprises a top surface coupled to the cylindrical outer body; an inner hub that forms an outlet that is in fluid communication with the orifice of the inner periphery of the cylindrical outer body; an outer edge; a plurality of annular concentric slots having a width (w) that are formed by a plurality of ribs, each slot having a length (L) that extends from the outer edge to the inner hub; and a bottom surface formed by the ribs, the bottom surface being flush with the lower surface of the cylindrical outer body. The plurality of concentric ribs extend from the outer edge of the insert to the internal hub of the insert, thereby, forming the walls of the slots present in the material saving insert.

The width (w) of each slot remains substantially the same along its length (L); alternatively, the width (w) of each slot approximate to the outer edge varies by 5% or less from the width (w) of the slot approximate to the inner hub. Each slot further comprises a depth that is variable and tapers along its length (L), such that the depth of the slot approximate to the outer edge ($d_o$) is less than the depth of the slot approximate to the inner hub ($d_i$). Alternatively, the depth ($d_o$) of each slot approximate to the outer edge is at least 10% less than the depth ($d_i$) of the slot approximate to the inner hub.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
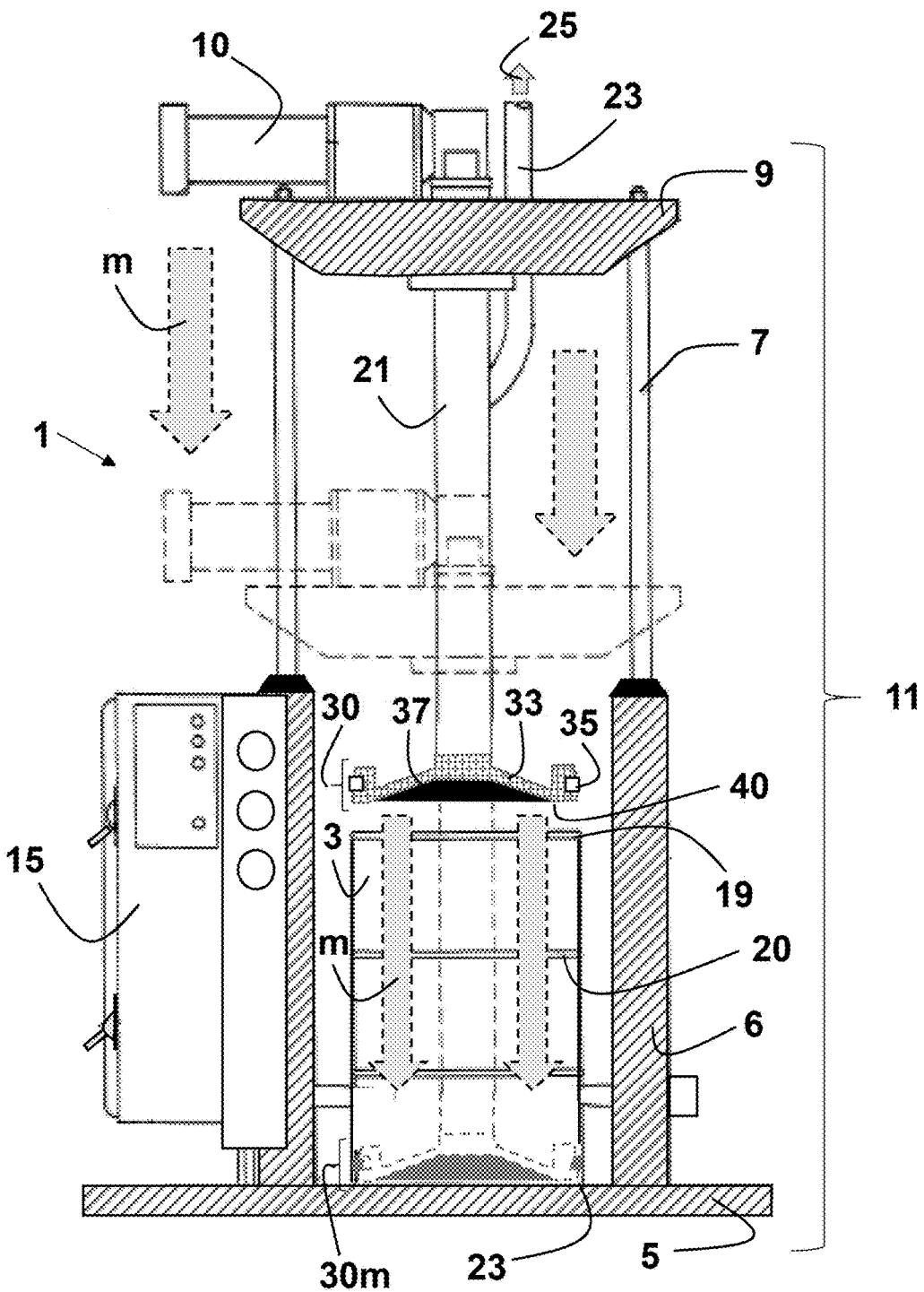
FIG. 1 is a schematic representation of an apparatus formed and used according to the teachings of the present disclosure.

The drawings described herein are for illustration purposes only and are not intended to limit the scope of the present disclosure in any way.

DETAILED DESCRIPTION

The present disclosure generally provides a follower plate that is easily and inexpensively manufactured, as well as extremely efficient in operation. The follower plate is capable of evacuating as much of the viscous material as possible, e.g., 99% or more, out of conventional storage containers. In addition, the follower plate is able to effectively hold any residual material that remains after dispensing the bulk of the material from the container in order to minimize the generation of waste upon the change out of the empty storage container for a full storage container filled with fresh viscous material. When desirable, the follower plate may incorporate one or more heaters suitable for the heating of the viscous material to a liquefied condition so that the viscous material may be more easily removed from the container.

The following description is merely exemplary in nature and is in no way intended to limit the present disclosure or its application or uses. For example, the follower plate made and used according to the teachings contained herein is described throughout the present disclosure in conjunction with dispensing a hot melt adhesive in order to more fully illustrate the composition and the use thereof. The incorporation and use of such a follower plate in an apparatus to dispense other viscous materials, such as other adhesives, sealants, syrups, gels, pastes, mastics, gums, or the like from a storage container is contemplated to be within the scope of the present disclosure. It should be understood that throughout the description, corresponding reference numerals indicate like or corresponding parts and features.

Referring to FIG. 1, an apparatus 1 configured to force a viscous material 3 from a bulk storage container 20 is provided. This apparatus 1, generally, comprises a follower plate 30 as described above and further defined herein, a pump assembly 10 that includes a pipe 21 or tube that is in fluid communication with the follower plate 30; at least one controller 15, and a support stand 11 that includes a base 5, two or more upright cylinders 6 and rods 7 associated therewith, and one or more support crossbars 9. When desirable, the base 5 may be designed such that it provides support for the bulk storage container 20. One skilled in the art will understood that additional support members connected between cylinders 6 and base 5 may be used when necessary or desirable.

The pump assembly 10 may include any air-operated motor driven pump or electric motor driven pump. Alternatively, the pump assembly 10 includes an air-operated motor. The pump is generally a positive displacement type pump, including but not limited to, a piston pump, a gear or rotary lobe pump, a rotary vane pump, or a diaphragm pump.

The controller 15 integrated with the apparatus 1 may comprise any conventional or available controller system. The controller 15 is generally configured to control one or more physical system parameters, including without limitation, pressure, temperature, material flow rate, rate of compression, etc. Alternatively, the controller is configured to control a plurality of the physical system parameters. When desirable, the controller 15 may be supported on the base 5 of the apparatus 1 as shown in FIG. 1.

Still referring to FIG. 1, the follower plate 30 is configured to fit into an open-end 19 of a bulk storage container 20. This storage container 20 may be constructed of a material capable of withstanding the forces generated during the removal of the viscous material 3 stored therein. The overall size of the storage container 20 may include any size and geometry that is commonly used or desirable for the storage of a viscous material 3. The container may range in volume, without limitation from about 20 liters (5 gallons) to about 200 liters (55 gallons). For example, the storage container 20 may comprise, but not be limited to, a 200-liter (55-gallon) drum, a 20-liter (5-gallon) pail, a 5-liter (1-gallon) can, or the like. The inner peripheral surface of the storage container is configured to interact with the follower plate 30 through a sealing element 35 in order to provide a leak-proof seal.

The viscous material 3 may exhibit a viscosity that is 30,000 millipascal-seconds (centipoise) or greater. Alternatively, the viscosity of the viscous material may range from about 30,000 millipascal-seconds (centipoise) up to about 2,000,000 millipascal-seconds (centipoise).

The follower plate 30 of the apparatus 1 is in fluid communication with one end of a pipe or tube 21 and aligned with an open end 19 of the storage container 20. During operation, the follower plate 30 may lowered into the storage container 20, thereby forcing the viscous material 3 to flow into the pipe or tube 21. In FIG. 1, the follower plate 30 is shown in a raised or elevated position prior to being inserted into the storage container 20. In this state, pressurized air is supplied to the support cylinders 6 in order to cause the cylinder rods 7 to extend from the support cylinders 6 such that the crossbar 9 and associated pump assembly 10 supported thereon are raised to an elevated position. When the follower plate 30 is inserted into the open end 19 of the storage container 20, pressurized air may be applied to the support cylinders 6 to cause the cylinder rods 7 to retract, and in turn cause the crossbar 9 to move in a downward direction. This movement (m) is depicted in FIG. 1 through the use of dotted lines. In this state, the follower plate 30 applies a force against the viscous material 3 in the storage container 20 in order to prime the pump, e.g., force material towards the inlet of the pump. The pump causes the viscous material 3 to be evacuated from the storage container 20 into the pipe or tube 21 that is in fluid communication therewith. Subsequently, the viscous material 3 is forced to flow 25 through a secondary pipe or tube 23 to an applicator or other fluid handling equipment for ultimate application onto the surface of a part (not shown).

When desirable, the follower plate 30 after being inserted into the opening 19 of the storage container 20 may be heated so that the viscous material 3 (e.g., a hot melt adhesive, etc.) contained within the storage container 20 becomes liquefied or placed into a condition that allows the material 3 to be more easily pumped from the storage container 20. As more and more of the viscous material 3 is removed from the storage container 20, the follower plate 30 continues to move (m) downward, e.g., be inserted, into the storage container 20 until the follower plate 30 reaches the bottom 23 of container 20 as shown in FIG. 1 as follower plate 30m (dotted lines).

Figure 2A:
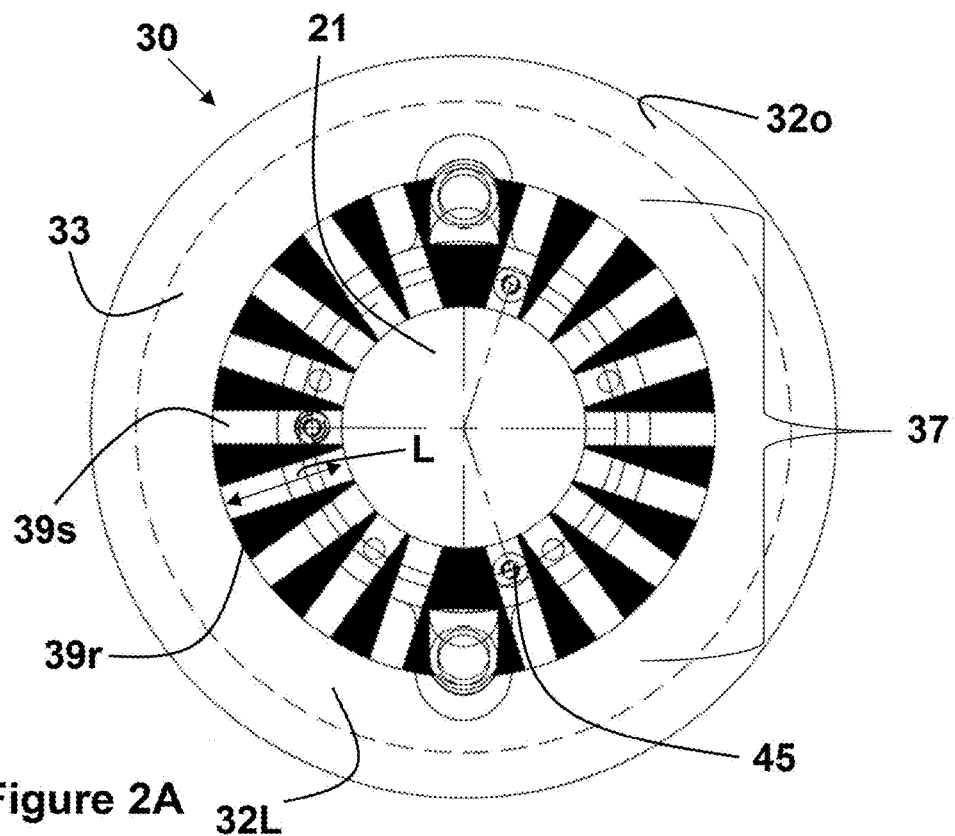
FIG. 2A is a bottom plan view of a follower plate used in the apparatus of FIG. 1.
Figure 2B:
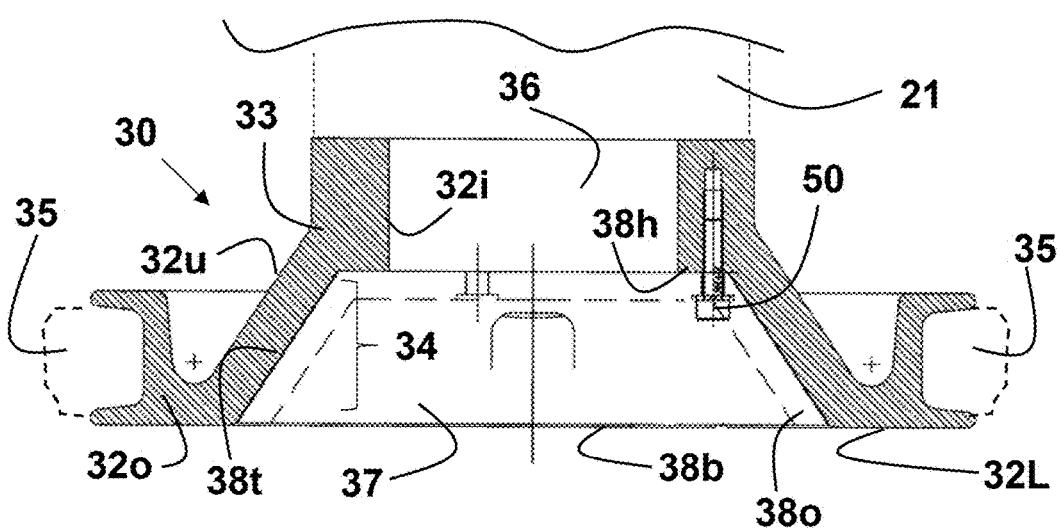
FIG. 2B is a cross-sectional view of the follower plate shown in FIG. 2A.

Referring now to FIGS. 2A and 2B the follower plate 30 generally comprises a cylindrical outer body 33, a sealing element 35, and a material saving insert 37. The cylindrical outer body 33 has an upper surface 32u, a lower surface 32L, an outer periphery 32o, an inner periphery 32i, and an indented region 34, wherein the inner periphery 32i forms an orifice 36 that is in fluid communication with an opening in a pipe or tube 21 of the apparatus through which the viscous material flows.

The sealing element 35 is located around the outer periphery 32o of the cylindrical outer body 33. The sealing element 35 is configured to provide a leak-proof seal with the storage container. The sealing element 35 may be comprised of one or more polymeric materials, including but not limited to, ultra-high molecular weight polyethylene (UHMWPE), polytetrafluorethylene (PTFE), or polyoxymethylene (POM). The sealing element may be a solid composite material or an inflatable bladder, as well as a combination thereof. For example, the sealing element may be, without limitation, an o-ring seal or a gasket that comes into contact with the inner peripheral surface of the storage container. The storage container is not typically filled to capacity because the sealing element must make contact with the container in order to form a proper seal prior to removal of the viscous material from the container. By positioning the sealing element 35 around the outer periphery 32o of the follower plate 30, the amount of unfilled space at the top of the storage container can be minimized.

The material saving insert 37 is configured to fit within the indented region 34 of the cylindrical outer body 33. The material saving insert 37 comprises a top surface 38t coupled to the cylindrical outer body 33; an inner hub 38h that forms an outlet that is in fluid communication with the orifice of the inner periphery 32i of the cylindrical outer body 33; an outer edge 38o; a plurality of annular concentric slots 39s having a width that are formed by a plurality of ribs 39r, each slot 39s having a length (L) that extends from the outer edge 38o to the inner hub 38h; and a bottom surface 38b formed by the ribs 39r, the bottom surface 38b being flush with the lower surface 32L of the cylindrical outer body 33. The bottom surface 38b and lower surface 32L are flush in order to provide a flat surface configured to enhance the amount of material that can be removed from the storage container. The plurality of slots 39s run radially inwardly from the outer circumference 38o of material saving insert 37 as full passages that extend completely to central evacuation point, i.e., the hub 38h, which is in fluid communication with the pipe 21 coupled to the pump assembly.

Still referring to FIGS. 2A and 2B, the material saving insert 37 may be secured to the cylindrical outer body 33 through the use of any conventional fastening means. Such fastening may include, but not be limited to, the use of a plurality of screws or bolts 50 secured to the outer cylindrical body 33 through holes 45 in the material saving insert 33.

Figure 3A:
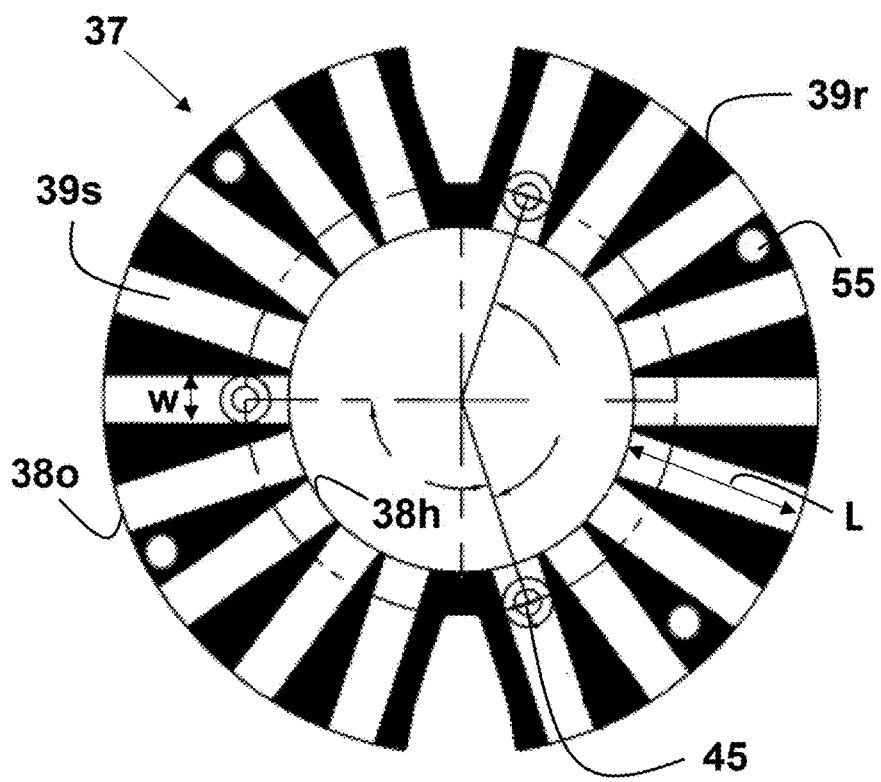
FIG. 3A is a bottom plan view of a material saving insert incorporated into the follower plate shown in FIG. 2A.
Figure 3B:
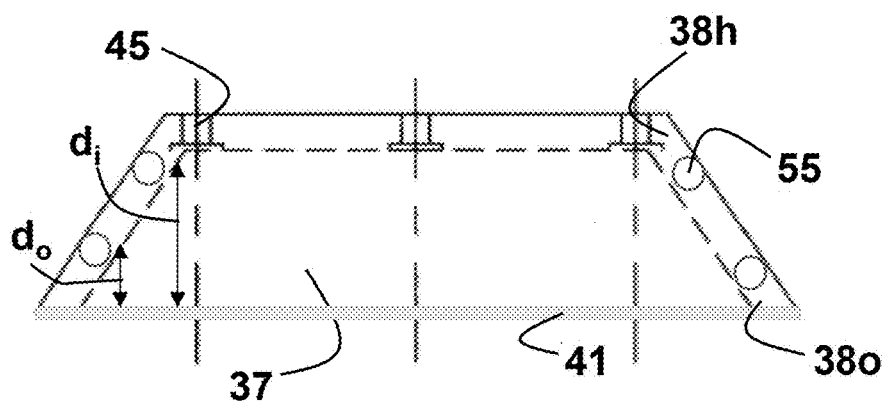
FIG. 3B is a cross-sectional view of the material saving insert shown in FIG. 3A.

Referring now to FIGS. 3A and 3B, the width (w) of each slot 39s remains substantially the same along its length (L). Alternatively, the width (w) of each slot 39s approximate to the outer edge 38o varies by 5% or less from the width (w) of the slot 39s approximate to the inner hub 38h. Alternatively, the variation in width (w) along the length (L) of each slot 39s is less than 3%. The width (w) of each slot 39s is at least 1.27 centimeters (0.5 inch); alternatively, the width (w) of each slot 39s is approximately 1.91 centimeters (0.75 inch); alternatively, the width (w) of each slot 39s ranges between 1.27 centimeters (0.5 inch) and 2.54 centimeters (1.0 inch).

Each slot 39s further comprises a depth that is variable and tapers along its length (L), such that the depth ($d_o$) of the slot 39s approximate to the outer edge 38o is less than the depth ($d_i$) of the slot 39s approximate to the inner hub 38h. Alternatively, the depth ($d_o$) of each slot 39s approximate to the outer edge 38o is at least 10% less than the depth ($d_i$) of the slot 39s approximate to the inner hub 38h. Alternatively, the depth ($d_o$) of each slot 39s approximate to the outer edge 38o is at least 25% less than depth ($d_i$) of the slot 39s approximate to the inner hub 38h.

The width (w) and depth ($d_i$, $d_o$) of each slot 39s are independently selected in order to maximize the amount of viscous material removed from the storage container. The width (w) and depth ($d_i$, $d_o$) of each slot 39s are configured such that when the bottom surface of the material saving insert 38b and lower surface 32L of the cylindrical outer body 33 reach the bottom of the storage container any viscous material that has not been dispensed from the storage container resides within the slots 39s. Viscous materials remain within the slots 39s during the change-out of the empty storage container for a new storage container containing fresh viscous material, thereby, minimizing the creation of any waste. The viscous materials to be dispensed are often comparatively expensive products. It is therefore desirable not only for ecological reasons, but also for economical reasons, to empty the containers completely or at least down to the smallest possible remaining amount.

The cylindrical outer body 33 and the material saving insert 37 may be made of either different materials or similar materials. Alternatively, the cylindrical outer body 33 and the material saving insert 37 are made of the same material. The cylindrical outer body 33 and/or the material saving insert 37 may comprise, without limitation, a ceramic material, aluminum, an aluminum alloy, carbon steel, stainless steel, or another type of steel. Alternatively, the cylindrical outer body 33 and/or the material saving insert 37 are made of aluminum or an aluminum alloy. The follower plate 30 including each of the different components incorporated therein may be formed by casting, machining, or any other conventional manufacturing method or combination thereof.

When desirable, the bottom surface 38b of the material saving insert formed by the ribs 39r and/or the surface of one or more slots 39s present in the material saving insert 37 may be at least partially covered with a protective film 41. Alternatively, the surface of each slot 39s in the material saving insert 37 is covered with a protective film 41. The protective film 41 may provide, without limitation, corrosion protection, lubricating properties, and/or abrasion protection to the surface of the follower plate 30. The composition of protective film 41 may include, but not be limited to polytetrafluoroethylene (PTFE), an epoxy material, or any other polymeric material or combination thereof that can maintain its structural integrity under the operating conditions associated with the use of the follower plate 30. Alternatively, the composition of the protective film 41 is polytetrafluoroethylene (PTFE).

Still referring now to FIGS. 2A-3B, the follower plate 30 may be configured to include one or more thermal elements 55 capable of heating the viscous material in the storage container. The heating of the viscous material increases the ability to pump the material from the storage container by softening the material or causing a portion of the material to liquefy. The thermal elements 55 may be embedded within the follower plate 30 or in contact therewith. For example, the thermal elements 55 may be located in the end of the ribs 39r and extend circumferentially around the follower plate 30. Locating the thermal elements 55 at or near the point of initial contact between the follower plate 30 and the viscous material in the storage container provides for enhanced efficiency in terms of melting or softening the viscous material for the amount of power that is applied to do so.

For the purpose of this disclosure the terms "about" and "substantially" are used herein with respect to measurable values and ranges due to expected variations known to those skilled in the art (e.g., limitations and variability in measurements).

For the purpose of this disclosure, the terms "at least one" and "one or more of" an element are used interchangeably and may have the same meaning. These terms, which refer to the inclusion of a single element or a plurality of the elements, may also be represented by the suffix "s" at the end of the element. For example, "at least one slot", "one or more slots", and "slots" may be used interchangeably and are intended to have the same meaning.

Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A follower plate for use in an apparatus that forces a viscous material to flow from a storage container, the follower plate comprising:
    a cylindrical outer body having an upper surface, a lower surface, an outer periphery, an inner periphery, and an indented region, wherein the inner periphery forms an orifice that is in fluid communication with an opening in a pipe or tube of the apparatus through which the viscous material flows;
    a sealing element located around the outer periphery of the cylindrical outer body, the sealing element configured to provide a leak-proof seal with the storage container; and
    a material saving insert configured to fit within the indented region of the cylindrical outer body; the material saving insert comprising:
        a top surface coupled to the cylindrical outer body;
        an inner hub that forms an outlet that is in fluid communication with the orifice of the inner periphery of the cylindrical outer body;
        an outer edge;
        a plurality of annular concentric slots having a width (w) that are formed by a plurality of ribs, each slot having a length (L) that extends from the outer edge to the inner hub; and
        a bottom surface formed by the ribs, the bottom surface being flush with the lower surface of the cylindrical outer body.

2. The follower plate according to claim 1, wherein the width (w) of each slot remains substantially the same along its length (L).

3. The follower plate according to claim 2, wherein the width (w) of each slot approximate to the outer edge varies by 5% or less from the width (w) of the slot approximate to the inner hub.

4. The follower plate according to claim 1, wherein each slot further comprises a depth that is variable and tapers along its length (L), such that the depth of the slot approximate to the outer edge ($d_o$) is less than the depth of the slot approximate to the inner hub ($d_i$).

5. The follower plate according to claim 4, wherein the depth ($d_o$) of each slot approximate to the outer edge is at least 10% less than the depth ($d_i$) of the slot approximate to the inner hub.

6. The follower plate according to claim 4, wherein the depth ($d_o$) of each slot approximate to the outer edge is at least 25% less than depth ($d_i$) of the slot approximate to the inner hub.

7. The follower plate according to claim 1, wherein the cylindrical outer body and the material saving insert are made of similar materials.

8. The follower plate according to claim 7, wherein the cylindrical outer body and the material saving insert are made of aluminum or an aluminum alloy.

9. The follower plate according to claim 1, wherein the bottom surface of the material saving insert and/or the surface of each slot is coated with a layer of polytetrafluoroethylene (PTFE).

10. The follower plate according to claim 1, wherein the width (w) of each slot is at least 1.27 centimeters (0.5 inches).

11. The follower plate according to claim 10, wherein the width (w) of each slot is approximately 1.91 centimeters (0.75 inches).

12. The follower plate according to claim 1, wherein the follower plate is configured to include one or more thermal elements capable of heating the material in the storage container.

13. The follower plate according to claim 1, wherein the viscous material has a viscosity of 30,000 millipascal-seconds (centipoise) or greater.

14. The follower plate according to claim 1, wherein the follower plate is configured to fit into an open-end of the storage container.

15. The follower plate according to claim 1, wherein the storage container is a 55-gallon drum, a 5-gallon pail, a 1-gallon can, or the like.

16. An apparatus for forcing a viscous material to flow from a storage container, the apparatus comprising:
    a follower plate that includes the elements of claim 1;
    a pump assembly that includes a pipe or tube in fluid communication with the follower plate;
    a support stand comprising a base, two or more cylinders and rods, and a crossbar; and
    at least one controller.

17. The apparatus according to claim 16, wherein the pump assembly includes an air-operated motor.

18. The apparatus according to claim 16, wherein the follower plate is configured to fit into an open-end of the storage container.

19. The apparatus according to claim 16, wherein the storage container is a 55-gallon drum, a 5-gallon pail, a 1-gallon can, or the like.

20. The apparatus according to claim 16, wherein the viscous material has a viscosity of 30,000 millipascal-seconds (centipoise) or greater.

* * * * *